(12) United States Patent
Ranjan et al.

(10) Patent No.: US 10,493,401 B2
(45) Date of Patent: Dec. 3, 2019

(54) TEMPERATURE CONTROLLED NITROGEN GENERATION SYSTEM

(71) Applicant: Hamilton Sundstrand Corporation, Charlotte, NC (US)

(72) Inventors: Rajiv Ranjan, South Windsor, CT (US); Zissis A. Dardas, Worcester, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/503,873

(22) Filed: Jul. 5, 2019

(65) Prior Publication Data

US 2019/0329177 A1   Oct. 31, 2019

Related U.S. Application Data

(62) Division of application No. 16/175,293, filed on Oct. 30, 2018, which is a division of application No.
(Continued)

(51) Int. Cl.
*B01D 53/22* (2006.01)
*B01D 53/30* (2006.01)
*B64D 37/32* (2006.01)

(52) U.S. Cl.
CPC ............ *B01D 53/30* (2013.01); *B01D 53/22* (2013.01); *B01D 53/228* (2013.01); *B64D 37/32* (2013.01);
(Continued)

(58) Field of Classification Search
CPC ...... B01D 53/30; B01D 53/22; B01D 53/228; B01D 2053/221; B01D 2256/10;
(Continued)

(56) References Cited

U.S. PATENT DOCUMENTS 3,467,349 A   9/1969   Gautier
3,590,559 A   7/1971   Bragg
(Continued)

OTHER PUBLICATIONS

Reynolds et al., "Onboard Inert Gas Generation System/Onboard Oxygen Gas Generation System (OBIGGS/OBOGS) Study," NASA/CR-2001-210950, Aug. 2001, pp. 72.
(Continued)

*Primary Examiner* — Anthony R Shumate
(74) *Attorney, Agent, or Firm* — Kinney & Lange, P.A.

(57) ABSTRACT

A nitrogen generation system includes a heat exchanger for receiving supply air and cooling air and providing temperature conditioned supply air, a flow control valve for controlling a flow of the cooling air through the heat exchanger, and an air separation module for receiving the temperature conditioned supply air and generating nitrogen-enriched air. The nitrogen generation system also includes a sensor for measuring a parameter of the nitrogen-enriched air selected from the group consisting of a temperature, a flow rate, an oxygen concentration, and combinations thereof, and a controller connected to the sensor and the flow control valve for controlling the flow of the cooling air through the heat exchanger based on the parameter of the nitrogen-enriched air measured by the sensor.

12 Claims, 3 Drawing Sheets

Related U.S. Application Data

14/736,819, filed on Jun. 11, 2015, now Pat. No. 10,137,406.

(52) U.S. Cl.
CPC .... *B01D 2053/221* (2013.01); *B01D 2256/10* (2013.01); *B01D 2257/104* (2013.01); *B01D 2259/4575* (2013.01); *Y02T 50/44* (2013.01)

(58) Field of Classification Search
CPC ...... B01D 2257/104; B01D 2259/4575; B64D 37/32; Y02T 50/44
See application file for complete search history.

(56) References Cited

U.S. PATENT DOCUMENTS

| | | | |
|---|---|---|---|
| 3,877,443 A | 4/1975 | Henning et al. | |
| 4,061,848 A * | 12/1977 | Sistig | C08F 2/04 526/61 |
| 4,237,836 A * | 12/1980 | Tanasawa | F02M 17/08 123/472 |
| 4,288,404 A | 9/1981 | Redikultsev et al. | |
| 4,338,959 A * | 7/1982 | Krueger | F01P 11/06 123/198 R |
| 4,369,738 A * | 1/1983 | Hirayama | F01P 7/165 123/41.1 |
| 4,381,736 A * | 5/1983 | Hirayama | F01P 7/164 123/41.1 |
| 4,393,840 A * | 7/1983 | Tanaka | F02D 41/005 123/179.16 |
| 4,709,900 A | 12/1987 | Dyhr | |
| 4,934,999 A | 6/1990 | Bader | |
| 5,271,846 A | 12/1993 | Uragami et al. | |
| 5,294,345 A | 3/1994 | Kaschemekat | |
| 5,357,749 A | 10/1994 | Ohsuga et al. | |
| 5,624,374 A | 4/1997 | Von Iderstein | |
| 5,823,713 A | 10/1998 | Biran | |
| 6,105,580 A | 8/2000 | Von Iderstein et al. | |
| 6,125,638 A | 10/2000 | Ji et al. | |
| 6,250,976 B1 * | 6/2001 | Ozawa | F01N 3/28 440/1 |
| 6,491,739 B1 | 12/2002 | Crome et al. | |
| 6,729,359 B2 | 5/2004 | Jones | |
| 7,081,153 B2 | 7/2006 | Leigh et al. | |
| 7,274,601 B2 | 9/2007 | Lue | |
| 7,306,644 B2 | 12/2007 | Leigh et al. | |
| 7,509,968 B2 | 3/2009 | Surawski | |
| 7,625,434 B2 | 12/2009 | Tom et al. | |
| 8,122,738 B2 | 2/2012 | Saul | |
| 8,801,831 B1 | 8/2014 | Snow, Jr. et al. | |
| 10,137,406 B2 | 11/2018 | Ranjan et al. | |
| 2003/0005928 A1 | 1/2003 | Appel et al. | |
| 2003/0233936 A1 | 12/2003 | Crome | |
| 2004/0065383 A1 | 4/2004 | Jones et al. | |
| 2005/0115404 A1 | 6/2005 | Leigh et al. | |
| 2005/0223895 A1 | 10/2005 | Wong | |
| 2005/0247197 A1 | 11/2005 | Snow, Jr. | |
| 2006/0060591 A1 | 3/2006 | Rohrig | |
| 2006/0113276 A1 | 6/2006 | Rohrig | |
| 2007/0222349 A1 * | 9/2007 | Lantis | H01J 61/34 313/12 |
| 2010/0108692 A1 | 5/2010 | Gupta | |
| 2010/0155046 A1 | 6/2010 | Surawski | |
| 2010/0212493 A1 | 8/2010 | Rasmussen et al. | |
| 2010/0269698 A1 | 10/2010 | Yates et al. | |
| 2010/0313750 A1 | 12/2010 | Sanders, Jr. et al. | |
| 2011/0000666 A1 * | 1/2011 | Couto | F22B 1/1853 166/272.3 |
| 2011/0059377 A1 | 3/2011 | Scotto et al. | |
| 2012/0017637 A1 * | 1/2012 | Nakajo | B60H 1/03 62/515 |
| 2013/0177497 A1 | 7/2013 | Fitch | |
| 2014/0065021 A1 | 3/2014 | Edlund | |
| 2014/0360366 A1 | 12/2014 | Matteucci et al. | |
| 2015/0033711 A1 | 2/2015 | Hyde et al. | |
| 2016/0009831 A1 * | 1/2016 | Sumida | C08F 2/01 526/65 |
| 2016/0051806 A1 | 2/2016 | Goldsmith | |
| 2016/0265493 A1 | 9/2016 | Bima | |
| 2016/0362298 A1 | 12/2016 | Du et al. | |
| 2018/0087165 A1 * | 3/2018 | Alcaraz | C25B 15/02 |
| 2018/0280883 A1 | 10/2018 | Eda et al. | |
| 2019/0194806 A1 | 6/2019 | She et al. | |

OTHER PUBLICATIONS

Extended European Search Report for EP Application No. 16174189.7, dated Nov. 8, 2016, pp. 8.

* cited by examiner

TEMPERATURE CONTROLLED NITROGEN GENERATION SYSTEM

CROSS-REFERENCE TO RELATED APPLICATION(S)

This application is a divisional of U.S. application Ser. No. 16/175,293 filed Oct. 30, 2018 for "TEMPERATURE CONTROLLED NITROGEN GENERATION SYSTEM" by R. Ranjan and Z. A. Dardas, which in turn claims the benefit of U.S. application Ser. No. 14/736,819 filed Jun. 11, 2015 for "TEMPERATURE CONTROLLED NITROGEN GENERATION SYSTEM" by R. Ranjan and Z. A. Dardas,

BACKGROUND

This disclosure relates to aircraft safety, and more specifically to a temperature controlled nitrogen generation system.

Aircraft fuel tanks and containers can contain potentially combustible combinations of oxygen, fuel vapors, and ignition sources. In order to prevent combustion, the ullage of fuel tanks and containers is filled with air with high nitrogen concentration, or nitrogen-enriched air (NEA), such that the oxygen concentration in the ullage is less than 12%. A membrane-based nitrogen generation system (NGS) is commonly used to produce NEA for inerting fuel tanks and containers. A membrane-based NGS has an air separation module with a polymeric membrane which separates air into NEA and oxygen-enriched air (OEA). However, at a given temperature, a polymeric membrane material has a fixed permeability (defined as the transport flux of a gas through the membrane per unit driving force, i.e. partial pressure difference between the two sides of the membrane per unit membrane thickness) and selectivity (selectivity $\alpha_{AB}$ is defined as the ratio of permeability of one gas component A to the permeability of another gas component B in a gas mixture), which limits the performance of the air separation module. As a result, a larger and heavier NGS than desired is required to provide adequate fuel tank and container inerting throughout the flight profile of an aircraft.

SUMMARY

In one embodiment, a nitrogen generation system includes a heat exchanger for receiving supply air and cooling air and providing temperature conditioned supply air, a flow control valve for controlling a flow of the cooling air through the heat exchanger, and an air separation module for receiving the temperature conditioned supply air and generating nitrogen-enriched air. The nitrogen generation system also includes a sensor for measuring a parameter of the nitrogen-enriched air selected from the group consisting of a temperature, a flow rate, an oxygen concentration, and combinations thereof, and a controller connected to the sensor and the flow control valve for controlling the flow of the cooling air through the heat exchanger based on the parameter of the nitrogen-enriched air measured by the sensor.

In another embodiment, a nitrogen generation system includes a mixer for receiving supply air and cooling air and providing temperature conditioned supply air, a flow control valve for controlling a flow of the cooling air into the mixer, and an air separation module for receiving the temperature conditioned supply air and generating nitrogen-enriched air. The nitrogen generation system also includes a sensor for measuring a parameter of the nitrogen-enriched air selected from the group consisting of a temperature, a flow rate, an oxygen concentration, and combinations thereof; and a controller connected to the sensor and the flow control valve for controlling the flow of the cooling air through the heat exchanger based on the parameter of the nitrogen-enriched air measured by the sensor.

In another embodiment, a method of generating nitrogen-enriched air includes cooling supply air with cooling air to produce temperature conditioned supply air, flowing a flow of the temperature conditioned supply air through an air separation module to generate nitrogen-enriched air, measuring a parameter of the nitrogen-enriched air selected from the group consisting of a temperature, a flow rate, an oxygen concentration, and combinations thereof, and controlling a flow of the cooling air based on the parameter of the nitrogen-enriched air.

DETAILED DESCRIPTION

The present disclosure relates to a membrane-based nitrogen generation system (NGS) for generating air with high nitrogen concentration (nitrogen-enriched air). The NGS controls the temperature of the membrane in an air separation module (ASM) in order to control the flow rate and oxygen concentration of the nitrogen-enriched air (NEA) produced by the ASM. Controlling the temperature of the membrane allows for manipulation of the selectivity and permeability of the membrane of the ASM, which in turn controls the flow rate and oxygen concentration of the NEA produced by the ASM. Controlling the temperature of the membrane of the ASM allows the NGS to meet varying demand for NEA during an aircraft's flight profile. The NGS of the present disclosure improves performance of the ASM, and therefore allows for a reduction in volume and weight of the ASM.

Figure 1:
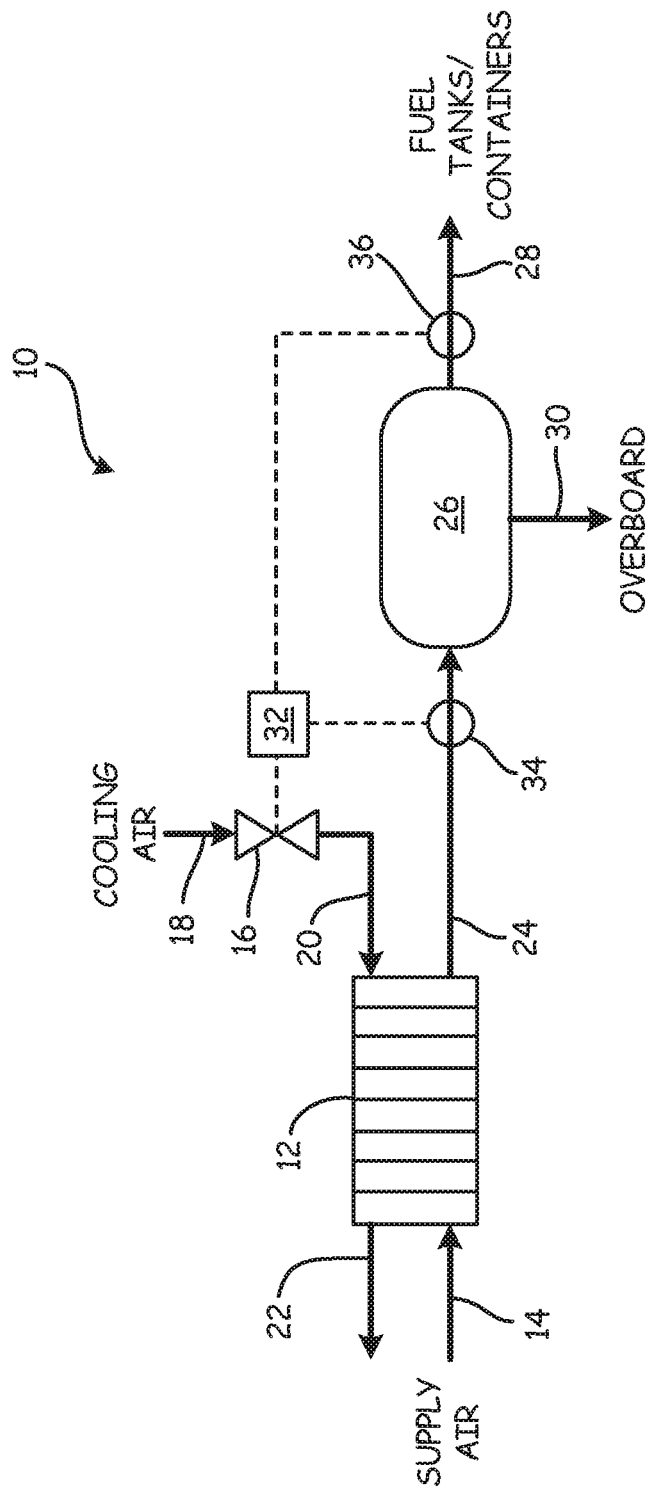
FIG. 1 is a schematic view of a temperature controlled nitrogen generation system.

FIG. 1 is a schematic view of NGS 10. NGS 10 includes heat exchanger 12, supply air input 14, flow control valve 16, cooling air input 18, cooling air line 20, cooling air output 22, temperature conditioned air line 24, ASM 26, NEA line 28, oxygen-enriched air (OEA) line 30, controller 32, sensor 34, and sensor 36.

Heat exchanger 12 receives supply air through supply air input 14. Flow control valve 16 receives cooling air through cooling air input 18. Cooling air flows out of flow control valve 16 and into heat exchanger 12 through cooling air line 20. Used cooling air exits heat exchanger 12 through cooling air output 22. Temperature conditioned air exits heat exchanger 12 through temperature conditioned air line 24. ASM 26 receives temperature conditioned air through temperature conditioned air line 24. ASM 26 produces NEA and OEA. NEA exits ASM 26 through NEA line 28, and OEA exits ASM 26 through OEA line 30. Controller 32 is connected to flow control valve 16, sensor 34, and sensor 36. Sensor 34 measures parameters of the temperature conditioned air in temperature conditioned air line 24. Sensor 36 measures parameters of NEA in NEA line 28.

NGS 10 generates NEA for an aircraft for inerting fuel tanks and other containers. In order to generate NEA, supply air, such as bleed air, flows through supply air input 14 and into heat exchanger 12. The supply air entering heat exchanger 12 is between about 300 degrees Fahrenheit (148 degrees Celsius) and about 450 degrees Fahrenheit (233 degrees Celsius). Cooling air, such as ram air, also flows into heat exchanger 12 through cooling air line 20. The cooling air flows into flow control valve 16 through cooling air input 18. Flow control valve 16 controls the flow of cooling air through cooling air line 20 and into heat exchanger 12. The cooling air entering heat exchanger 12 is between about −50 degrees Fahrenheit (−46 degrees Celsius) and about 110 degrees Fahrenheit (43.4 degrees Celsius).

Heat exchanger 12 is an air-to-air heat exchanger, such as a plate heat exchanger or a shell and tube heat exchanger. The cooling air flows through heat exchanger 12 to cool the supply air flowing through heat exchanger 12. Temperature conditioned air exits heat exchanger 12 through temperature conditioned air line 24, and used cooling air exits heat exchanger 12 through cooling air output 22. Flow control valve 16 controls the flow of cooling air into heat exchanger 12 in order to control the temperature of the temperature conditioned air exiting heat exchanger 12 and entering ASM 26. The temperature conditioned air exiting heat exchanger 12 is between about 60 degrees Fahrenheit (15 degrees Celsius) and about 200 degrees Fahrenheit (93.4 degrees Celsius).

The temperature conditioned air flows through temperature conditioned air line 24 and into ASM 26. Sensor 34 measures parameters such as temperature, flow rate, and oxygen concentration of the temperature conditioned air in temperature conditioned air line 24. ASM 26 can be a membrane-based ASM made of a polymer such as poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, or combinations thereof. ASM 26 separates the temperature conditioned air to generate NEA and OEA. NEA exits ASM 26 through NEA line 28 and is distributed to fuel tanks and other containers in the aircraft that require inerting. Sensor 36 measures parameters such as temperature, flow rate, and oxygen concentration of the NEA in NEA line 28. The concentration of oxygen in the NEA exiting ASM 26 is between about 1% and about 12%. OEA exits ASM 26 through OEA line 30 and is dumped overboard.

NGS 10 controls the flow rate and oxygen concentration of the NEA in NEA line 28 with controller 32. Controller 32 is connected to flow control valve 16, sensor 34, and sensor 36. Controller 32 controls the flow of the cooling air into heat exchanger 12 based on the value of the parameters measured by sensor 36. Sensor 36 provides measurements of parameters such as temperature, flow rate, and oxygen concentration of the NEA in NEA line 28 to controller 32. The temperature of the NEA in NEA line 28 is the temperature of the membrane in ASM 26. Based on the desired oxygen concentration and flow rate of the NEA in NEA line 28, controller 32 controls how much flow control valve 16 is opened or closed in order to control the temperature of the temperature conditioned air entering ASM 26 and thus control the temperature of the membrane of ASM 26. NGS 10 can also include sensor 34 in order to measure parameters such as temperature, flow rate, and oxygen concentration of the temperature conditioned air entering ASM 26, but sensor 36 provides the primary control signal based upon which controller 32 adjusts the flow of the cooling air into heat exchanger 12.

NGS 10 generates NEA with varying flow rate and oxygen concentration based on demand during an aircraft's flight profile. The flow rate and oxygen concentration of the NEA leaving ASM 26 is controlled by controlling the temperature of the membrane of ASM 26. The temperature of the membrane of ASM 26 is controlled by controlling the temperature of the temperature conditioned air entering ASM 26. The temperature conditioned air entering ASM 26 can be between about 60 degrees Fahrenheit (15 degrees Celsius) and about 200 degrees Fahrenheit (93.4 degrees Celsius). At lower temperatures, ASM 26 generates NEA with a lower oxygen concentration (can be as low as about 1%) and a lower flow rate. At higher temperatures, ASM 26 generates NEA with a higher oxygen concentration (can be as high as about 12%) and a higher flow rate. The specific temperature ranges depend on the material of the membrane.

During the ascent and cruise portions of the flight profile of an aircraft, a lower amount of NEA is required. During the ascent and cruise portions, NGS 10 thus controls the temperature of the membrane of ASM 26 to produce NEA with a lower flow rate and lower oxygen concentration (under 7-8% oxygen and as low as about 1% oxygen). The most NEA is required during the descent portion of the flight profile. During the descent portion, NGS 10 thus controls the temperature of the membrane of ASM 26 to produce NEA with a higher flow rate and higher oxygen concentration (between about 10% and about 12%). NGS 10 is advantageous, because NGS 10 improves performance of ASM 26 by controlling the temperature of the membrane of ASM 26, allowing for a reduction in volume and weight of ASM 26.

Figure 2:
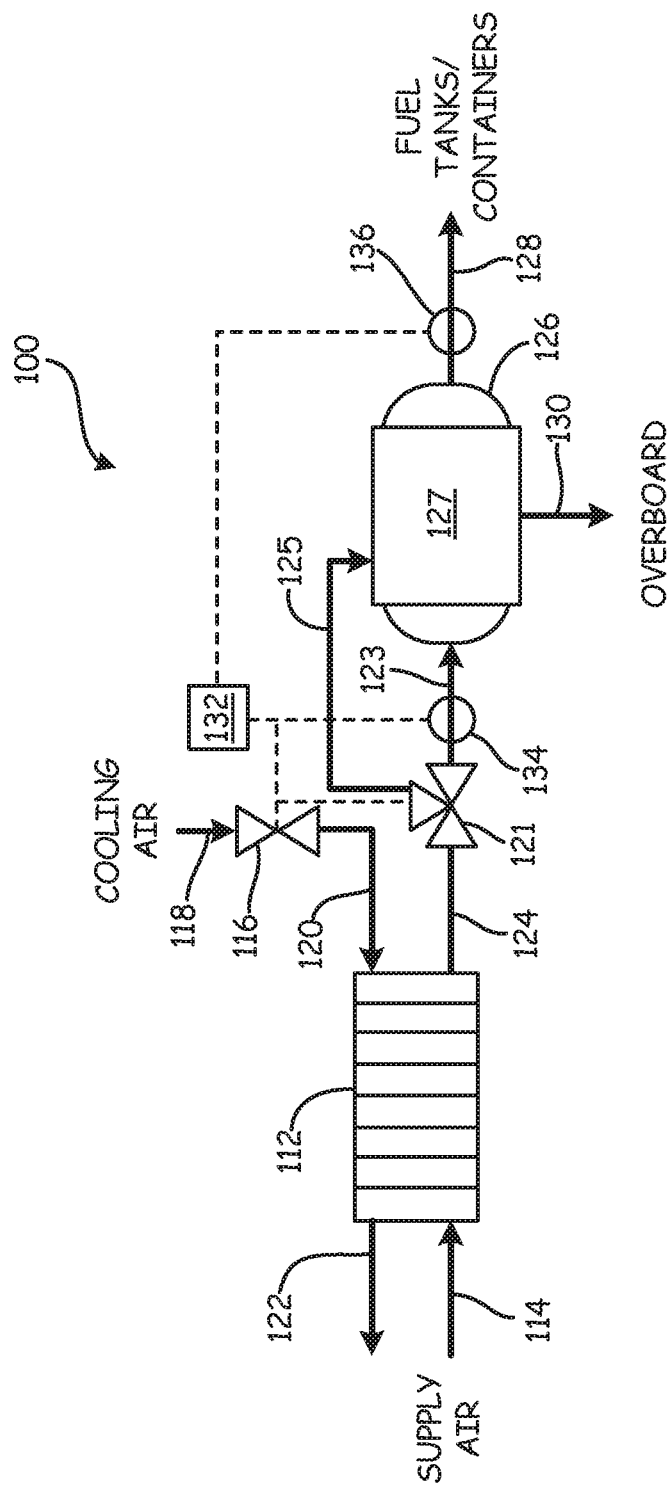
FIG. 2 is a schematic view of another embodiment of a temperature controlled nitrogen generation system.

FIG. 2 is a schematic view of nitrogen generation system 100. NGS 100 includes heat exchanger 112, supply air input 114, flow control valve 116, cooling air input 118, cooling air line 120, flow control valve 121, cooling air output 122, temperature conditioned air line 123, temperature conditioned air line 124, temperature conditioned air line 125, ASM 126, jacket 127, NEA line 128, OEA line 130, controller 132, sensor 134, and sensor 136.

Heat exchanger 112 receives supply air through supply air input 114. Flow control valve 116 receives cooling air through cooling air input 118. Cooling air flows out of flow control valve 116 and into heat exchanger 112 through cooling air line 120. Used cooling air exits heat exchanger 112 through cooling air output 122. Temperature conditioned air exits heat exchanger 112 through temperature conditioned air line 124. Flow control valve 121 receives temperature conditioned air through temperature conditioned air line 124. Temperature conditioned air flows out of flow control valve 121 and into ASM 126 through temperature conditioned air line 123. ASM 126 produces NEA and OEA. Jacket 127 surrounds ASM 126 and receives temperature conditioned air through temperature conditioned air line 125. NEA exits ASM 126 through NEA line 128, and OEA exits ASM 126 through OEA line 130. Controller 132 is connected to flow control valve 116, flow control valve 121, sensor 134, and sensor 136. Sensor 134 measures parameters of the temperature conditioned air in temperature conditioned air line 123. Sensor 136 measures parameters of NEA in NEA line 128.

NGS 100 functions similarly to NGS 10 in FIG. 1, except NGS 100 also includes jacket 127. Supply air, such as bleed air, flows through supply air input 114 and into heat exchanger 112. Cooling air, such as ram air, also flows into heat exchanger 112 through cooling air line 120. The cooling air flows into flow control valve 116 through cooling air input 118. Flow control valve 116 controls the flow of cooling air through cooling air line 120 and into heat exchanger 12.

The cooling air flows through heat exchanger 112 to cool the supply air flowing through heat exchanger 112. Temperature conditioned air exits heat exchanger 112 through temperature conditioned air line 124, and used cooling air exits heat exchanger 112 through cooling air output 122. Flow control valve 116 controls the flow of cooling air into heat exchanger 112 in order to control the temperature of the temperature conditioned air exiting heat exchanger 112 and entering ASM 126 and jacket 127.

The temperature conditioned air flows through temperature conditioned air line 124 and into flow control valve 121. Flow control valve 121 can be a three way valve. Flow control valve 121 controls the flow of temperature conditioned air into ASM 126 through temperature conditioned air line 123 and the flow of temperature conditioned air into jacket 127 through temperature conditioned air line 125.

Sensor 134 measures parameters such as temperature, flow rate, and oxygen concentration of the temperature conditioned air in temperature conditioned air line 123. ASM 126 separates the temperature conditioned air to generate NEA and OEA. NEA exits ASM 126 through NEA line 128 and is distributed to fuel tanks and other containers in the aircraft that require inerting. Sensor 136 measures parameters such as temperature, flow rate, and oxygen concentration of the NEA in NEA line 128.

NGS 100 controls the flow rate and oxygen concentration of the NEA in NEA line 128 with controller 132. Controller 132 is connected to flow control valve 116, flow control valve 121, sensor 134, and sensor 136. Controller 132 controls the flow of the cooling air into heat exchanger 112 and the flow of temperature conditioned air into ASM 126 and jacket 127 based on the value of the parameters measured by sensor 136. Sensor 136 provides measurements of parameters such as temperature, flow rate, and oxygen concentration of the NEA in NEA line 128 to controller 132. The temperature of the NEA in NEA line 128 is the temperature of the membrane in ASM 126.

Based on the desired oxygen concentration and flow rate of the NEA in NEA line 128, controller 132 controls how much flow control valve 116 and flow control valve 121 are opened or closed in order to control the temperature of the temperature conditioned air entering ASM 126 and thus control the temperature of the membrane of ASM 126. Controller 132 also controls how much flow control valve 121 is opened or closed in order to provide further temperature control of the membrane of ASM 126 by flowing additional temperature conditioned air through jacket 127. Flowing temperature conditioned air through both ASM 126 and jacket 127 is advantageous, because the temperature of the membrane of ASM 126 can be changed at a quicker rate. NGS 100 can also include sensor 134 in order to measure parameters such as temperature, flow rate, and oxygen concentration of the temperature conditioned air entering ASM 126, but sensor 136 provides the primary control signal based upon which controller 132 adjusts the flow of the cooling air into heat exchanger 112 and temperature conditioned air into ASM 126 and jacket 127.

Figure 3:
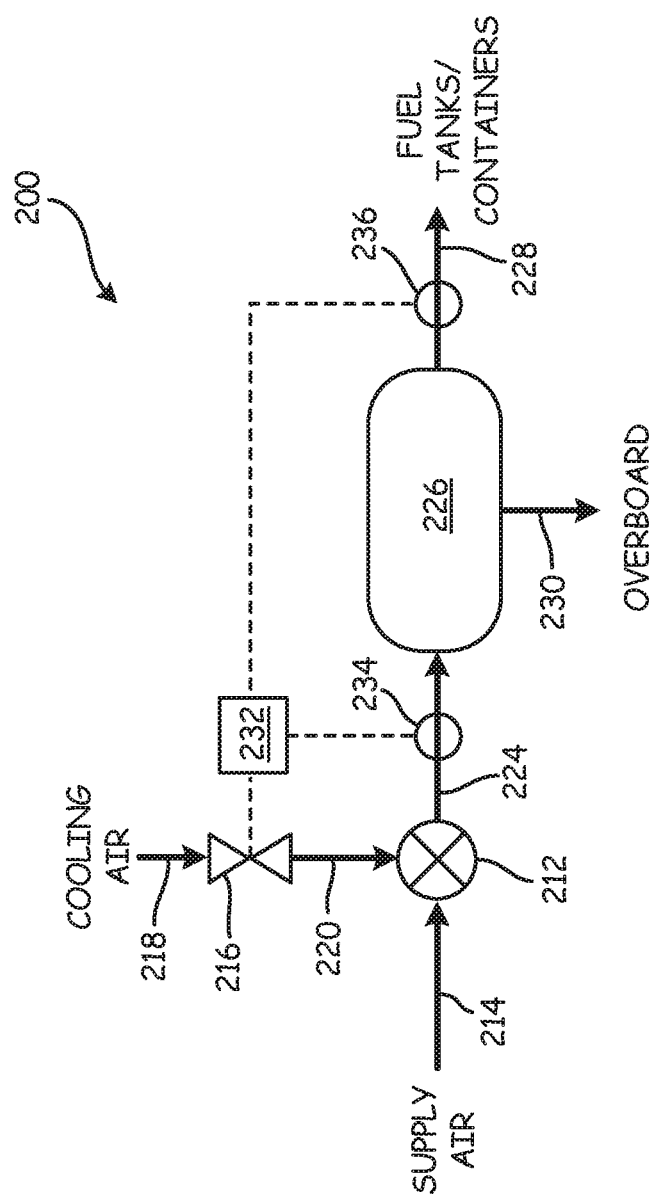
FIG. 3 is a schematic view of another embodiment of a temperature controlled nitrogen generation system.

FIG. 3 is a schematic view of nitrogen generation system 200. NGS 200 includes mixer 212, supply air input 214, flow control valve 216, cooling air input 218, cooling air line 220, temperature conditioned air line 224, ASM 226, NEA line 228, OEA line 230, controller 232, sensor 234, and sensor 236.

Mixer 212 receives supply air through supply air input 214. Flow control valve 216 receives cooling air through cooling air input 218. Cooling air flows out of flow control valve 216 and into mixer 212 through cooling air line 220. Temperature conditioned air exits mixer 212 through temperature conditioned air line 224. ASM 226 receives temperature conditioned air through temperature conditioned air line 224. ASM 226 produces NEA and OEA. NEA exits ASM 226 through NEA line 228, and OEA exits ASM 226 through OEA line 230. Controller 232 is connected to flow control valve 216, sensor 234, and sensor 236. Sensor 234 measures parameters of the temperature conditioned air in temperature conditioned air line 224. Sensor 236 measures parameters of NEA in NEA line 228.

NGS 200 functions similarly to NGS 10 in FIG. 1, except NGS 200 includes mixer 212 instead of heat exchanger 12. Supply air, such as bleed air, flows through supply air input 214 and into mixer 212. The supply air entering mixer 212 is between about 30 psi and about 40 psi. Cooling air also flows into mixer 212 through cooling air line 220. The cooling air flows into flow control valve 216 through cooling air input 218. Flow control valve 216 controls the flow of cooling air through cooling air line 220 and into mixer 212. The cooling air entering mixer 212 is between about 30 psi and about 40 psi.

Mixer 212 mixes the supply air and cooling air in order to produce temperature conditioned air. Temperature conditioned air exits mixer 212 through temperature conditioned air line 224. Flow control valve 216 controls the flow of cooling air into mixer 212 in order to control the temperature of the temperature conditioned air exiting mixer 212 and entering ASM 226. The temperature conditioned air flows through temperature conditioned air line 224 and into ASM 226. Sensor 234 measures parameters such as temperature, flow rate, and oxygen concentration of the temperature conditioned air in temperature conditioned air line 224. ASM 226 separates the temperature conditioned air to generate NEA and OEA. NEA exits ASM 226 through NEA line 228 and is distributed to fuel tanks and other containers in the aircraft that require inerting. Sensor 236 measures parameters such as temperature, flow rate, and oxygen concentration of the NEA in NEA line 228. OEA exits ASM 226 through OEA line 230 and is dumped overboard.

NGS 210 controls the flow rate and oxygen concentration of the NEA in NEA line 228 with controller 232. Controller 232 is connected to flow control valve 216, sensor 234, and sensor 236. Controller 232 controls the flow of the cooling air into mixer 212 based on the value of the parameters measured by sensor 236 in the same manner that controller 32 in FIG. 1 controls the flow of cooling air into heat exchanger 12.

Discussion of Possible Embodiments

The following are non-exclusive descriptions of possible embodiments of the present invention.

A nitrogen generation system according to an exemplary embodiment of this disclosure, among other possible things includes a heat exchanger for receiving supply air and cooling air and providing temperature conditioned supply air, a first flow control valve for controlling a flow of the cooling air through the heat exchanger, and an air separation module for receiving the temperature conditioned supply air and generating nitrogen-enriched air. The nitrogen generation system also includes a first sensor for measuring a parameter of the nitrogen-enriched air selected from the group consisting of a temperature, a flow rate, an oxygen concentration, and combinations thereof, and a controller connected to the first sensor and the first flow control valve for controlling the flow of the cooling air through the heat exchanger based on the parameter of the nitrogen-enriched air measured by the first sensor.

The nitrogen generation system of the preceding paragraph can optionally include, additionally and/or alternatively, any one or more of the following features, configurations and/or additional components:

A further embodiment of the foregoing nitrogen generation system, and further including a second sensor for measuring a parameter of the temperature conditioned supply air selected from the group consisting of a temperature, a flow rate, an oxygen concentration, and combinations thereof, wherein the second sensor is connected to the controller.

A further embodiment of any of the foregoing nitrogen generation systems, wherein the heat exchanger is a plate heat exchanger or a shell and tube heat exchanger.

A further embodiment of any of the foregoing nitrogen generation systems, wherein the supply air is bleed air and the cooling air is ram air.

A further embodiment of any of the foregoing nitrogen generation systems, wherein the air separation module comprises a membrane.

A further embodiment of any of the foregoing nitrogen generation systems, wherein the membrane is made of a polymer selected from the group consisting of poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, and combinations thereof.

A further embodiment of any of the foregoing nitrogen generation systems, and further including a jacket surrounding the air separation module and a second flow control valve connected to the controller.

A further embodiment of any of the foregoing nitrogen generation systems, wherein the second flow control valve is a three way valve for controlling a first flow of the temperature conditioned supply air into the air separation module and controlling a second flow of the temperature conditioned supply air into the jacket.

A nitrogen generation system according to an exemplary embodiment of this disclosure, among other possible things includes a mixer for receiving supply air and cooling air and providing temperature conditioned supply air, a flow control valve for controlling a flow of the cooling air into the mixer, and an air separation module for receiving the temperature conditioned supply air and generating nitrogen-enriched air. The nitrogen generation system also includes a first sensor for measuring a parameter of the nitrogen-enriched air selected from the group consisting of a temperature, a flow rate, an oxygen concentration, and combinations thereof, and a controller connected to the first sensor and the flow control valve for controlling the flow of the cooling air through the heat exchanger based on the parameter of the nitrogen-enriched air measured by the first sensor.

The nitrogen generation system of the preceding paragraph can optionally include, additionally and/or alternatively, any one or more of the following features, configurations and/or additional components:

A further embodiment of the foregoing nitrogen generation system, and further including a second sensor for measuring a parameter of the temperature conditioned supply air selected from the group consisting of a temperature, a flow rate, an oxygen concentration, and combinations thereof, wherein the second sensor is connected to the controller.

A method of generating nitrogen-enriched air according to an exemplary embodiment of this disclosure, among other possible things includes cooling supply air with cooling air to produce temperature conditioned supply air, flowing a first flow of the temperature conditioned supply air through an air separation module to generate nitrogen-enriched air, measuring a parameter of the nitrogen-enriched air selected from the group consisting of a temperature, a flow rate, an oxygen concentration, and combinations thereof, and controlling a flow of the cooling air based on the parameter of the nitrogen-enriched air.

The method of the preceding paragraph can optionally include, additionally and/or alternatively, any one or more of the following features, configurations and/or additional components:

A further embodiment of the foregoing method, wherein cooling the supply air includes flowing the supply air through a heat exchanger and flowing the flow of the cooling air through the heat exchanger.

A further embodiment of any of the foregoing methods, and further including flowing a second flow of temperature conditioned supply air through a jacket surrounding the air separation module.

A further embodiment of any of the foregoing methods, and further including controlling the first flow of the temperature conditioned supply air through the air separation module and controlling the second flow of the temperature conditioned supply air through the jacket based on the measured parameter of the nitrogen-enriched air.

A further embodiment of any of the foregoing methods, wherein cooling the supply air includes mixing the flow of the cooling air and the supply air.

A further embodiment of any of the foregoing methods, wherein the temperature of the supply air is between 148 degrees Celsius and 233 degrees Celsius.

A further embodiment of any of the foregoing methods, wherein the temperature of the cooling air is between −46 degrees Celsius and 43.4 degrees Celsius.

A further embodiment of any of the foregoing methods, wherein the temperature of the nitrogen-enriched air is between 15 degrees Celsius and 93.4 degrees Celsius.

A further embodiment of any of the foregoing methods, and further including measuring a parameter of the temperature conditioned supply air selected from the group consisting of a temperature, a flow rate, an oxygen concentration, and combinations thereof, wherein the second sensor is connected to the controller.

A further embodiment of any of the foregoing methods, wherein the oxygen concentration of the nitrogen-enriched air is less than 12 percent.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of generating nitrogen-enriched air, the method comprising:
    cooling supply air with cooling air to produce temperature conditioned supply air;
    flowing a first flow of the temperature conditioned supply air through an air separation module to generate nitrogen-enriched air;
    flowing a second flow of temperature conditioned supply air through a jacket surrounding the air separation module;
    measuring a parameter of the nitrogen-enriched air selected from the group consisting of a temperature, a flow rate, an oxygen concentration, and combinations thereof;
    controlling a flow of the cooling air based on the parameter of the nitrogen-enriched air.

2. The method of claim 1, wherein cooling the supply air comprises:
    flowing the supply air through a heat exchanger; and
    flowing the flow of the cooling air through the heat exchanger.

3. The method of claim 1, and further comprising controlling the first flow of the temperature conditioned supply air through the air separation module and controlling the second flow of the temperature conditioned supply air through the jacket based on the measured parameter of the nitrogen-enriched air.

4. The method of claim 1, wherein the temperature of the supply air is between 148 degrees Celsius and 233 degrees Celsius.

5. The method of claim 1, wherein the temperature of the cooling air is between −46 degrees Celsius and 43.4 degrees Celsius.

6. The method of claim 1, wherein the temperature of the nitrogen-enriched air is between 15 degrees Celsius and 93.4 degrees Celsius.

7. The method of claim 1, and further comprising measuring a parameter of the temperature conditioned supply air selected from the group consisting of a temperature, a flow rate, an oxygen concentration, and combinations thereof, wherein the second sensor is connected to the controller.

8. The method of claim 1, wherein the oxygen concentration of the nitrogen-enriched air is less than 12 percent.

9. A method of generating nitrogen-enriched air, the method comprising:
    cooling supply air with cooling air to produce temperature conditioned supply air by:
        flowing the supply air through a heat exchanger; and
        flowing the flow of the cooling air through the heat exchanger;
        flowing a first flow of the temperature conditioned supply air through an air separation module to generate nitrogen-enriched air;
    flowing a second flow of temperature conditioned supply air through a jacket surrounding the air separation module;
    measuring a parameter of the nitrogen-enriched air selected from the group consisting of a temperature, a flow rate, an oxygen concentration, and combinations thereof;
    controlling a flow of the cooling air based on the parameter of the nitrogen-enriched air.

10. The method of claim 9, wherein the supply air is bleed air and the cooling air is ram air.

11. The method of claim 9, wherein the air separation module comprises a membrane made of a polymer selected from the group consisting of poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, and combinations thereof.

12. The method of claim 9, wherein the jacket is configured to receive a portion of the temperature conditioned supply air simultaneously with the air separation module receiving temperature conditioned supply air.

* * * * *